United States Patent
Hansen et al.

(10) Patent No.: US 6,604,552 B2
(45) Date of Patent: Aug. 12, 2003

(54) METAL-PLASTIC MULTILAYER PIPE HAVING FORM STABILITY FOR PLUMBING AND HYDRONIC HEATING

(76) Inventors: Jorg Hansen, 4 Schillerstr., 48493 Wettringen (DE); Reinhold Freermann, 1f Seilerstr., 48607 Ochtrup (DE); Alfred Feldkamp, 17 Sandkuhle, 48607 Ochtrup (DE); Franz-Josef Riesselmann, 6 Lerchenstr., 49393 Lohne (DE)

( * ) Notice: Subject to any disclaimer, the term of this patent is extended or adjusted under 35 U.S.C. 154(b) by 0 days.

(21) Appl. No.: 09/820,236

(22) Filed: Mar. 28, 2001

(65) Prior Publication Data

US 2002/0007861 A1 Jan. 24, 2002

(30) Foreign Application Priority Data

Feb. 7, 2000 (EP) .......................................... 00 102 549

(51) Int. Cl.$^7$ .................................................. F16L 9/14
(52) U.S. Cl. ................. 138/143; 138/141; 138/DIG. 8; 138/140
(58) Field of Search .................................. 138/143, 141, 138/137, DIG. 8, DIG. 1, 140

(56) References Cited

U.S. PATENT DOCUMENTS

| | | | | | |
|---|---|---|---|---|---|
| 3,327,383 A | * | 6/1967 | Reed | ............................ | 138/152 |
| 4,669,508 A | * | 6/1987 | Neaves | ........................ | 138/121 |
| 5,573,039 A | * | 11/1996 | Mang | ........................... | 138/137 |
| 5,704,537 A | * | 1/1998 | Friedrich | .................... | 228/148 |
| 5,894,866 A | * | 4/1999 | Horst et al. | ................. | 138/103 |

* cited by examiner

Primary Examiner—Patrick Brinson
(74) Attorney, Agent, or Firm—Robert T. Dunn, Esq.

(57) ABSTRACT

Metal-plastic multilayer pipe with a plastic inner pipe (30) and a metal sheath (32) around the plastic inner pipe (30), where the metal sheath (32) is of uniform thickness, is applied to the plastic inner pipe (30) so that it completely encircles the plastic inner pipe (30) and a practical plastic outer layer (38), with the feature that the thickness of the metal sheath (32) as compared to the total thickness of all layers of the multilayer pipe (32, 34 and 38), is sufficiently thin that the metal sheath (32) accounts for a negligible part of the overall strength and stiffness of the multilayer pipe and, as a consequence, when the multilayer pipe is bent in an arc, the metal sheath (32) offers negligible resistance to such bending as compared to the resistance offered by the inner pipe (30) and the practical cover layer (38), and when so bent, the multilayer pipe tends to remain bent in said arc, whereby, the multilayer pipe has "form stability".

20 Claims, 1 Drawing Sheet

METAL-PLASTIC MULTILAYER PIPE HAVING FORM STABILITY FOR PLUMBING AND HYDRONIC HEATING

This invention relates to a metal-plastic multilayer pipe with a plastic inner pipe and metal sheath around the plastic inner pipe, suitable for use in hydronic heating systems and for domestic hot and cold water plumbing systems.

BACKGROUND OF THE INVENTION

Plastic Tubing For Hydronic Heating and Plumbing

In hydronic heating systems good quality "cross-linked" polyethylene tubing can carry water at temperature in excess of 140° F. without any deterioration of the tubing or the tubing oxygen barrier. The design criteria of plastic tubing for radiant floor and wall hydronic heating systems is determined by a number of important factors to insure an absolutely safe and reliable tubing. The same design criteria are often demanded for hot and cold water domestic plumbing systems. The most important design criteria requirements are:

1. High resistance to temperature aging for water temperatures up to 200° F.
2. High resistance to stress cracking.
3. High resistance to chemical solvents (water additives, antifreeze solutions, concrete additives).
4. Lowest possible linear thermal expansion.
5. High tensile strength.
6. High form stability.
7. High resistance to abrasion.
8. High resistance to deformation.
9. Dimensional tube tolerances.
9. Internal and external tube wall smoothness.
10. Behavior during long term internal pressure creep test which takes into account the temperature-dependent aging behavior of the pipe material at water temperatures up to 200° F.

Many of these requirements are dictated by the usual practice of embedding the tubing in a layer of concrete. They are design criteria that are outlined and specified in the ASTM standards (American Society for Testing and Materials), and DIN (German Industry Standards). Many, if not all of these design requirements can be achieved while still retaining a flexible and workable plastic tubing (pipe) as an end product. That tubing is called PEX, which is short for "Polyethelene Cross-Linked". PEX has been synonymous with plastic heating pipe in many European countries for several decades and has a track record that has made it the plastic tubing of choice for hydronic heating applications. Long term bench tests, which simulate 30 years of continuous use, in addition to accelerated testing which projects pipe performance well in excess of 30 years has confirmed the excellent long term real service life track record of PEX. Crossed-linked polyethylene tubing is now, after 20 years of use and improvements, the most widely accepted pipe material in the European plumbing industry for both heating and plumbing applications.

Plastic Tubing and Cross-Linking

The molecules of any plastic material tend to slip and slide over one another fairly freely. As ambient and water temperatures rise, the plastic material softens and finally melts. This thermal oxidation of plastic material is a long term aging process which will eventually result in pipe failure.

To combat this premature aging the molecules within the tubing are realigned in order to give greater stability to the material itself. The cross linking process takes place within the molecular structure of the plastic material. The most common thermoplastic materials currently being used for heating and plumbing pipe, often referred to as polyolefin materials are: Polyethylene (PE); Polypropylene (PP); and Polybuten (PB)(generic term for polybutylene). Among this family of polyolefin plastics, only Polyethylene has been determined to have the molecular structure which lends itself perfectly to the cross linking process.

"Un-cross-linked" polyethylene (PE) tubing, as it leaves the extruder where it receives its basic pipe dimension and wall thickness, is composed of long hydrocarbon string molecules forming a loosely held together array of hydrogen and carbon atoms which can be compared to a beaded curtain swaying in a breeze. This is basically the molecular composition of the PE tubing which is available at hardware stores and is suitable only for non-critical applications. A material, in this form, is not suitable for heating and plumbing applications. Within a relatively short period of time the pipe material fatigues under the stress of water temperature and pressure as well as temperature cycling and the beaded curtain of molecules splits open without resistance. By cross-linking the molecular "beads" (hydrocarbon string molecules), forming cross-connections which are referred to as cross-linking bridges, the string molecules form a three dimensional network of hydrocarbon molecules. The "beaded curtain" becomes transformed into a fishing net with strength and stability.

In this way, the previously non-applicable PE pipe is transformed, after cross-linking, into a completely different material with all the desired characteristics demanded for a heating or plumbing pipe. After the crosslinking of the PE tubing, its molecular mobility is severely impeded by the cross-linking bridges between the string molecules. The material does not flow or melt and its form becomes stable against heat. The material holds its shape at all temperatures, even exposed to blow torch temperatures until it chars or burns. The thermoplastic has been transformed into a thermoset material by cross-linking, eliminating the melting point or liquid phase of the material. The PE pipe has been transformed into PEX pipe Cross Linking Techniques There are basically two types of PE raw materials in use: Low to Medium density (LD or MD PE) and High density (HD PE). Low to Medium density polyethylene "SOFT PE" has a multibranch string molecule shape which allows a lower to medium density formation of string molecules within the pipe PE material.

High density polyethylene (HD PE) has a linear string molecule shape with only small stumps of branches, which allows for a higher density formation of string molecules within the pipe PE material.

The material density affects the physical properties of the pipe material. HD PE or "HARD PE" has a higher resistance to stress cracking and chemical solvents, higher tensile strength, higher resistance to deformation and is less permeable to oxygen Chemical Cross-linking techniques include: Peroxide Cross-linking; Silan Cross-linking via Dow Corning Method; and AZO Cross-Linking. Three methods of Peroxide Cross-Linking are the Engel, PAM and DAOPLAST methods.

Mechanical Cross-linking is Electronic Cross-linking by a Cross-Linking High Energy Electron Beam The various chemical cross-linking methods use chemical agents which are added to the PE base resin in order to form cross-linking bridges between the PE string molecules. The only practiced mechanical cross-linking method uses no chemical agents, instead, utilizes the high energy of an electron beam accelerator to form a three dimensional cross-linking network between the PE molecules.

Among the various chemical methods only two types are commonly used for heating pipe production: The Engel and Silan method. The Engel method, named after its inventor, uses a cross linking agent (peroxide) and heat stabilization agents which are mixed into the PE resin. The mixture is then compressed under high pressure in a "pre-molten" state and fed through the extrusion die, where the actual cross linking process takes place. This is a "press-sintering" process which achieves pipe extrusion and molecular cross-linking during one extrusion process.

The Silan method uses a mixture of two compounds with a mixing ratio of 95 to 5 parts. One compound consists of PE resin and cross-linking agents as well as other additives. The second compound consists of PE resin and a catalyst. After mixing both compounds, the pipe is extruded conventionally. The cross-linking reaction is triggered after extrusion by exposing the extruded coil to moisture such as steam or water. Most other chemical methods are variations of either the Engel or Silan method.

The electronic or mechanical cross linking method does not use any chemical means to achieve cross-linking bridges between the PE molecules. The basic PE resin is first extruded to give the pipe the basic required dimensional shape, then coiled up and fed through a high energy electron accelerator which exposes the extruded pipe material to the enormous energy of an electron beam. The energetic electrons strike the PE molecules at or near a carbon/hydrogen bond, releasing enough energy to the molecule to break that bond, setting the hydrogen atom free which diffuses out of the pipe in the form of hydrogen gas during the process. A large percentage of carbon atoms have then lost their hydrogen atom partner leaving the parent molecule in an excited state, able to form a new bond with another adjacent carbon atom without a hydrogen partner (called a free radical). These new carbon to carbon bonds are the desired cross linking bridges which form a three dimensional network among the PE string molecules.

Electronic cross-linking is the oldest known method of creating PEX. Over three decade ago, U.S. Companies applied this method to manufacture primarily cable enclosures including those used for undersea cables. This method was then adopted by Hewing GmbH of Germany for the production of heating and plumbing pipes.

Oxygen Diffusion in a Closed Loop System

A closed loop hydronic heating system will cause an oxygen poor water condition after the initial filling of the piping system. Oxygen depleted water (dead water) in an oxygen tight closed piping system is an effective and inexpensive heat transfer medium. The benefit of oxygen depleted water is its non-corrosiveness to system components, piping, valves, pumps, boilers, etc. However, this generated "oxygen vacuum" within a closed piping system causes a very high affinity in the system water for oxygen enrichment. This means that the generated oxygen vacuum in the system will absorb outside oxygen through any means possible.

In a steel or copper piping system the only source of oxygen permeation is through leaking fittings, valves, air vents, and above all, improperly sized expansion tank equipment. Copper or steel tubing itself is absolutely oxygen tight. However, that is not the case with plastic or rubber tubing. In recent years it has been discovered in Europe, after enormous corrosion and subsequent sludging problems developed in systems utilizing oxygen permeable plastic tubing in "closed systems", that plastic tubing allowed enough oxygen permeation through the pipe wall to cause corrosion in the system.

Subsequently, a special oxygen diffusion test for plastic tubing was developed to determine the amount of oxygen penetrating the tubing. The chemically bound oxygen (no visible air bubbles) in the system water entering through the pipe walls creates an extremely aggressive water condition, corroding not only ferrous materials but also copper, brass and plastics as well. The tests revealed that the rate of oxygen diffusion is directly related to the system water temperature—the higher the water temperature, the higher the rate of diffusion which is measured in milligrams per liter per day.

The German Industry standards (DIN) have determined that an oxygen diffusion rate of 0.1 mg/liter/day or less at a water temperature of 104° F. (40° C.) in plastic tubing is considered a safe level to prevent oxygen corrosion in heating system components. For comparison: The amount of 5 milligrams of oxygen per liter per day caused by oxygen diffusion through the pipe wall is equivalent to completely draining the heating system and refilling it with fresh water every other day during the heating season.

In order to eliminate the serious problems of oxygen diffusion on closed loop heating systems with plastic pipe, oxygen diffusion barriers have been developed. These barriers are usually applied to the exterior of the pipe. Each pipe manufacturer has its own method and process for applying this barrier. The main criteria for these barrier application techniques are the operating water temperatures of the intended pipe usage.

Oxygen diffusion is obviously no issue for plastic tubing intended for use on open hot and cold domestic hot water systems (plumbing systems) where oxygen is present at high concentrations in any case. However the aggressive corroding condition is prevented by the continuous dilution of fresh water to the system.

Heretofore, metal-plastic multilayer pipes have been manufactured continuously by placing a metal band around an extruded inner PE pipe. The metal band in its lengthwise extension is fed parallel to the axial extension of the inner PE pipe and laid around the inner pipe through forming. In the process, the longitudinal borders of the metal band join and are welded together (longitudinal joint welder) or the longitudinal borders overlap and are bonded in the overlapping area. The bonding agents used for this purpose are fairly sensitive to temperature, therefore there is a risk of leaks occurring in the bonded joint, and thus the function of the metal sheath of the inner pipe as diffusion and vapor barrier is no longer ensured.

This problem has been overcome by Hewing GmbH of Ochtrup, Germany, who use a bonding agent which creates an inseparable joint of the overlapping longitudinal borders of the metal band with a view to the expected temperature and mechanical load. As a consequence, the bonded joint does not consist of thermoplastic, but rather of duroplastic synthetic material. A two component or mixed adhesive, preferably on epoxy resin basis is especially suited for this purpose. In particular, the inner pipe is a PEX pipe and on the outside around the metal sheath, there is a practical (protective) plastic outer pipe which is extruded onto the metal sheath.

These metal-plastic multilayer pipes manufactured by Hewing GmbH satisfy the criteria for hydronic heating and have an excellent oxygen diffusion barrier that is required for closed hydronic heating systems and they satisfy all requirements of domestic hot and cold water plumbing systems. However, for both systems, and particularly for plumbing, installation throughout a building requires connecting many fittings, often one at every turn of the pipe and often at difficult to reach places.

Furthermore, in the past, the metal-plastic multilayer pipes for plumbing and heating have met SDR requirements specified in the ASTM standards, and DIN only by making the metal sheath a major structural part of the pipe and so the inner plastic pipe (which may be PEX) was not strong enough by itself to meet those requirements. As a consequence, the metal sheath accounted for a substantial part of the overall strength and stiffness of the multilayer pipe and could be bent by hand only with difficulty.

It is the principal object of the present invention to provide pipes that satisfy the criteria for hydronic heating and have an excellent oxygen diffusion barrier that is required for closed hydronic heating systems and also satisfy all requirements of hot and cold domestic hot water plumbing systems and have "form stability" so that the pipe can be bent readily into any shape without kinking and will retain the shape it is bent to.

SUMMARY OF THE INVENTION

According to an embodiment of the present invention a metal-plastic multilayer pipe is provided with a plastic inner pipe and a metal sheath around the plastic inner pipe, where the metal sheath is of uniform thickness is applied to the plastic inner pipe so that it completely encircles the plastic inner pipe, with the feature that the ratio of the thickness of the metal sheath to the total thickness of all layers of the pipe is substantially less than in the past and so the metal sheath accounts for a negligible part of the overall strength and stiffness of the multilayer pipe and is such that the pipe can be readily bent by hand and the metal layer offers negligible resistance to such bending as compared to the resistance offered by the inner pipe and any practical outside cover layer, so that the pipe has "form stability". This means that the pipe can be bent readily into any shape without kinking and will retain the shape it is bent to.

Furthermore, the metal layer even though relatively very thin is a complete oxygen barrier. Thus the inner pipe may be PEX to satisfy all of the the criteria for hydronic heating and plumbing and the metal layer provides substantially only an oxygen diffusion barrier that is required for closed hydronic heating systems and the "form stability".

DESCRIPTION OF THE DRAWINGS

FIG. 3 is a cross section of a metal-PEX multilayer pipe according to the present invention, the metal layer or sheath 32 with joining longitudinal borders 34 of the metal sheath placed around an inner PEX pipe 30 and welded at the border. At the joining area 36, these longitudinal borders 34 are welded and so are inseparably, the thickness of the metal sheath 32 and the thickness of the outer plastic layer 38 being sufficiently thin that the pipe has "form stability" so that the pipe can be bent readily into any shape without kinking and will retain the shape it is bent to;

DESCRIPTION OF EMBODIMENTS OF THE INVENTION

Figure 1:
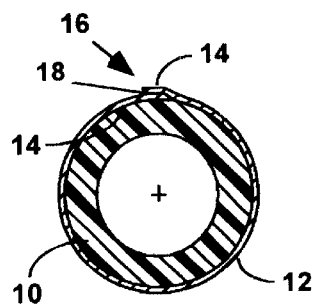
FIG. 1 (denoted PRIOR ART) is a cross section of a metal-PEX multilayer pipe developed by Hewing GmbH, the metal layer or sheath 12 with overlapping longitudinal borders 14 is placed around an inner PEX pipe 10. In the overlapping area 16, these longitudinal borders 14 are bonded permanently and inseparably (related to the temperature and mechanical load for which the multilayer pipe is designed) using a bonding agent 18.
Figure 2:
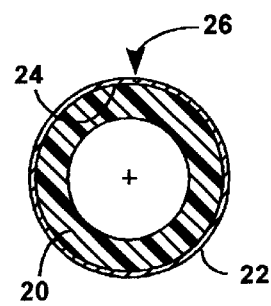
FIG. 2 (denoted PRIOR ART) is a cross section of a metal-PEX multilayer pipe developed by Hewing GmbH, the metal layer or sheath 22 with joining longitudinal borders 24 is placed around an inner PEX pipe 20. At the joining area 26, these longitudinal borders 24 are welded and so are inseparably.

Turning first to FIGS. 1 and 2, denoted PRIOR ART there is shown metal-PEX multilayer pipe developed by Hewing GmbH to provide pipe meeting all criteria for hydronic heating and having an oxygen diffusion and vapor barrier as well as pressure resistance even in the case of increased temperatures and mechanical load.

In FIG. 1 a metal-PEX multilayer pipe, the metal layer or sheath 12 has overlapping longitudinal borders 14 when it is placed around the inner PEX pipe 10. In the overlapping area 16, these longitudinal borders 14 are bonded permanently and inseparably (related to the temperature and mechanical load for which the multilayer pipe is designed) using a bonding agent 18;

In FIG. 2, also a metal-PEX multilayer pipe, the metal layer or sheath 22 with joining longitudinal borders 24 is placed around an inner PEX pipe 20. At the joining area 26, these longitudinal borders 24 are welded and so are inseparably.

Figure 3:
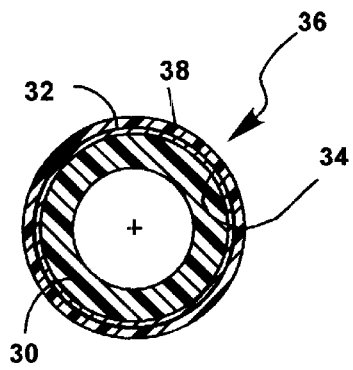
Figure 4:
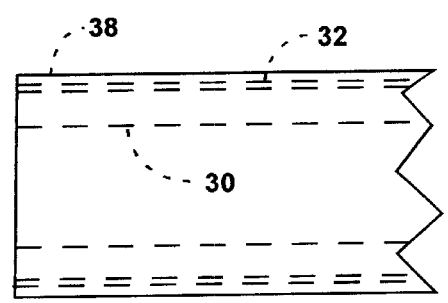
FIG. 4 is a side view of a piece of the pipe of FIG. 3.

FIG. 3 is a cross section of a metal-PEX multilayer pipe according to the present invention. FIG. 4 is a side view of a piece of the same pipe. The pipe layers are the inner PEX pipe (layer), metal sheath layer 32 and outer practical plastic layer 38. The metal layer or sheath 32 with joining longitudinal borders 34 is placed around an inner PEX pipe 30. At the joining area 36, these longitudinal borders 34 are welded and so are inseparably. Then a practical plastic outer pipe 38 that may be polyethylene plastic is extruded onto the metal sheath and can be cross-linked by irradiation. The pipe then is comprised of: inner PEX layer 30, metal layer 32 and outer practical plastic layer 38.

When the metal layer 32 is placed around the PEX pipe 30, a bonding agent (not shown) may be applied between them to insure that the metal layer is secured to the PEX pipe when the longitudinal borders 34 of the metal layer meet and are welded together at 36.

The thickness of the metal sheath layer 32 and the thickness of the outer practical plastic layer 38 are predetermined so that both can be readily bent by hand and offer negligible resistance to such bending as compared to the resistance offered by inner PEX layer 30. The inventor herein has discovered that when such a pipe is bent, the adhesion of the metal layer 32 to the inner PEX layer 30 is so great that it imposes its "form stability" on the inner PEX layer. In this way, the metal layer gives "form stability" as well as an oxygen diffusion and vapor barrier to the finished pipe. Furthermore, the pipe can be bent readily into any shape without kinking and will retain the shape it is bent to even after many temperature cycles.

Figure 5:
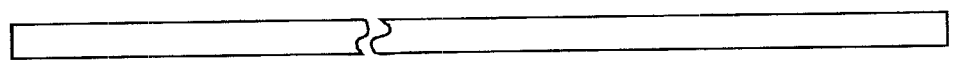
FIG. 5 is a much reduced scale side view of a piece of the pipe of FIGS. 3 and 4 that is several feet long.
Figure 6:
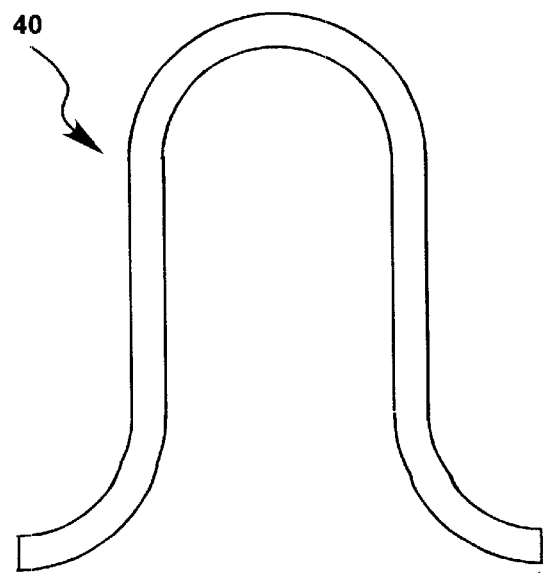
FIG. 6 illustrates a shape that the length of pipe of FIG. 5 can be readily bent to as a demonstration of "form stability"

FIG. 5 is a much reduced scale side view of a piece 40 of the pipe of FIGS. 3 and 4 that is several feet long; and FIG. 6 illustrates a shape that the length of pipe 40 of FIG. 5 can be readily bent to as a demonstration of "form stability".

In summary, the primary feature of the present invention is that the ratio of the thickness of the metal sheath 32 to the total thickness of all layers of the pipe (32, 34 and 38) is substantially less than in the past and so the metal sheath accounts for a negligible part of the overall strength and stiffness of the multilayer pipe and is such that the pipe can be readily bent by hand and the metal layer offers negligible resistance to such bending as compared to the resistance offered by the inner pipe 30 and any practical outside cover layer such as 38. As a consequence, the multilayer pipe has "form stability".

While the invention is described herein in connection with a preferred embodiment, it will be understood that it is not intended to limit the invention to that embodiment. It is intended to cover all alternatives, modifications, equivalents and variations of that embodiment and its features as may be made by those skilled in the art within the spirit and scope of the invention as defined by the appended claims.

What is claimed is:

1. In a metal-plastic multilayer pipe with a plastic inner pipe (30) and a metal sheath (32) around the plastic inner pipe (30), where the metal sheath (32) is of uniform thickness and is applied to the plastic inner pipe (30) so that it completely encircles the plastic inner pipe (30) and is bonded thereto, the improvement comprising:
    a practical outer layer (38) bonded to the metal sheath (32),
    the thickness of the metal sheath (32) as compared to the total thickness of all layers of the pipe (30, 32 and 38) is sufficiently thin that the metal sheath (32) accounts for a negligible part of the overall strength and stiffness of the multilayer pipe and, as a consequence, when the multilayer pipe is bent in an arc, the metal sheath (32) offers negligible resistance to such bending as compared to the resistance offered by the inner pipe (30) and the practical outer layer (38), and, when so bent, the multilayer pipe tends to remain bent in said arc,
    whereby, the multilayer pipe has "form stability".

2. A metal-plastic multilayer pipe according to claim 1, wherein,
    the practical outer layer (38) is cross-linked by irradiation.

3. A metal-plastic multilayer pipe according to claim 1, wherein,
    the metal sheath (32) contains aluminum.

4. A metal-plastic multilayer pipe according to claim 1, wherein,
    the plastic inner pipe (30) contains cross-linked polyethylene (PEX) material.

5. A metal-plastic multilayer pipe according to one of the claims 1 to 4, wherein,
    the plastic inner pipe (30) is substantially stronger and resistant to bending than the practical outer layer (38).

6. A metal-plastic multilayer pipe comprising,
    a plastic inner pipe (30),
    a metal sheath (32) around the plastic inner pipe (30) that is applied to the plastic inner pipe (30) by placing a metal band (12) with longitudinal borders (14) around plastic inner pipe (30), so that the longitudinal borders (14) overlap and are welded together within the overlapping area (16),
with the feature that
    the thickness of the metal sheath (32) as compared to the total thickness of all layers of the pipe (30 and 32), is sufficiently thin that the metal sheath (32) accounts for a negligible part of the overall strength and stiffness of the multilayer pipe and, as a consequence, when the multilayer pipe is bent in an arc, the metal sheath (32) offers negligible resistance to such bending as compared to the resistance offered by the inner pipe (30), and when so bent, the multilayer pipe tends to remain bent in said arc,
    whereby, the multilayer pipe has "form stability".

7. A metal-plastic multilayer pipe according to claim 6, wherein,
    a bonding agent is applied between the metal sheath (32) and the plastic inner pipe (30).

8. A metal-plastic multilayer pipe according to claim 7, wherein,
    a practical outer layer (38) is bonded to the metal sheath (32) and
    the practical outer layer (38) and said bonding agent are cross-linked by irradiation.

9. A metal-plastic multilayer pipe according to claim 6, wherein,
    said bonding agent contains a two-component adhesive.

10. A metal-plastic multilayer pipe according to claim 6, wherein,
    said bonding agent contains an epoxy resin.

11. A metal-plastic multilayer pipe according to claim 6, wherein,
    the metal sheath (32) contains aluminum.

12. A metal-plastic multilayer pipe according to claim 6, wherein,
    the plastic inner pipe (30) contains cross-linked polyethylene (PEX) material.

13. A metal-plastic multilayer pipe according to one of the claims 6, 7 and 9 to 12, wherein,
    a practical outer layer (38) is applied to the metal sheath (32).

14. A method of making a metal-plastic multilayer pipe that has "form stability", comprising the steps of:
    Providing a plastic inner pipe (30) and a band of metal sheath (32):
        Wrapping the metal sheath (32) around the plastic inner pipe (30) so that the longitudinal borders (14) thereof overlap along an overlapping area (16); and
        Welding said longitudinal borders (14) together within the overlapping area (16); the thickness of the metal sheath (32) as compared to the total thickness of all layers of the multilayer pipe (30 and 32) is sufficiently thin that the metal sheath (32) accounts for a negligible part of the overall strength and stiffness of the multilayer pipe and, as a consequence, when the multilayer pipe is bent in an arc, the metal sheath (32) offers negligible resistance to such bending as compared to the resistance offered by the inner pipe (30), and when so bent, the multilayer pipe tends to remain bent in said arc,
        whereby, the multilayer pipe has "form stability".

15. A method of making a metal-plastic multilayer pipe that has "form stability" according to claim 14, including the additional step of:

Bonding a practical outer layer (38) to the metal sheath (32).

16. A method of making a metal-plastic multilayer pipe that has "form stability" according to claim 15, wherein, said practical outer layer (38) contains polyethylene plastic.

17. A method of making a metal-plastic multilayer pipe that has "form stability" according to claim 16, including the additional step of:

Irradiating the practical outer layer (38) to cause cross-linking.

18. A method of making a metal-plastic multilayer pipe that has "form stability" according to claim 14, wherein, the metal sheath (32) contains aluminum.

19. A method of making a metal-plastic multilayer pipe that has "form stability" according to claim 14, wherein, the plastic inner pipe {30) contains cross-linked polyethylene (PEX) material.

20. A method of making a metal-plastic multilayer pipe that has "form stability" according to claim 15, wherein, the plastic inner pipe (30) is substantially stronger and resistant to bending than the practical outer layer (38).

* * * * *